United States Patent [19]

Suzuki et al.

[11] Patent Number: 4,720,800

[45] Date of Patent: Jan. 19, 1988

[54] DEVICE FOR MEASURING LIQUID FLOW VOLUME WITH TEMPERATURE COMPENSATING

[75] Inventors: Takashi Suzuki; Yasushi Saisu, both of Tokyo, Japan

[73] Assignee: Tokyo Tatsuno Co., Ltd., Tokyo, Japan

[21] Appl. No.: 65,685

[22] Filed: Jun. 17, 1987

Related U.S. Application Data

[63] Continuation of Ser. No. 631,026, Jul. 16, 1984, abandoned.

[30] Foreign Application Priority Data

| Jul. 20, 1983 | [JP] | Japan | 58-130918 |
| Jul. 20, 1983 | [JP] | Japan | 58-130919 |
| Aug. 25, 1983 | [JP] | Japan | 58-154118 |
| Aug. 26, 1983 | [JP] | Japan | 58-154748 |

[51] Int. Cl.⁴ ........................... G01F 1/76; G01F 15/02
[52] U.S. Cl. ................................. 364/510; 73/861.03; 364/571; 377/21; 377/50
[58] Field of Search ........................................ 377/21, 50

[56] References Cited

U.S. PATENT DOCUMENTS

| 3,530,458 | 9/1970 | Willard et al. | 340/347 |
| 3,614,892 | 10/1971 | Ottenstein | 73/233 |
| 3,699,320 | 10/1972 | Zimmerman et al. | 235/151.34 |
| 3,831,011 | 8/1974 | Hulme | 234/151.34 |
| 3,895,529 | 7/1975 | Moore | 73/194 M |
| 3,905,229 | 9/1975 | Togo et al. | 73/194 E |
| 4,038,534 | 7/1977 | Mirdadian | 377/50 |
| 4,056,717 | 11/1977 | Cornforth | 364/510 |
| 4,101,056 | 7/1978 | Mattimoe et al. | 222/26 |
| 4,150,433 | 4/1979 | Kaniel | 364/571 |
| 4,253,156 | 2/1981 | Lisle et al. | 364/571 |
| 4,384,925 | 5/1983 | Stetter et al. | 204/1 T |
| 4,404,638 | 9/1983 | Yada et al. | 364/510 |
| 4,464,646 | 8/1984 | Burger et al. | 338/308 |
| 4,532,601 | 4/1985 | Lenderking et al. | 364/571 |
| 4,542,638 | 9/1985 | Tlaker | 73/1 R |

OTHER PUBLICATIONS

Prazak, Paul and Mrozowski, Andrij, "Correcting Errors Digitally in Data Acquisition and Control", Electronics, Nov. 22, 1979, vol. 52, No. 24.

Primary Examiner—Errol A. Krass
Assistant Examiner—Daniel W. Juffernbruch
Attorney, Agent, or Firm—Jordan and Hamburg

[57] ABSTRACT

A device for measuring the volume of flowing liquid with temperature compensation includes a device for generating a volume signal, a device for detecting the temperature of the fluid to generate a temperature signal, and an electronic computer for receiving the volume and temperature signals to calculate a compensated volume. A device is provided for setting the value of the specific gravity of the liquid so that the computer, which is stored with coefficients for compensating the volume of various liquids each having the respective specific gravity at a standard temperature, the specific gravity being varied depending on the liquid temperature, selects one of the coefficients with reference to the set specific gravity value and the temperature value and calculates the compensated volume per volume signal and outputs the latter to a displaying device.

2 Claims, 11 Drawing Figures

DEVICE FOR MEASURING LIQUID FLOW VOLUME WITH TEMPERATURE COMPENSATING

This application is a continuation of application Ser. No. 631,026 filed July 16, 1984, now abandoned.

FIELD OF THE INVENTION

The invention generally relates to a device for determining the volume of a flowing liquid inclusive of crude oil and petroleum products with temperature compensation, and more particularly to such a device designed to readily and reliably set a particular specific gravity necessary for compensation with temperature and capable of compensating or detecting other errors of determined volume.

BACKGROUND OF THE INVENTION

It is necessary to provide a reliable device for metering the volume of various flowing liquids. It has severely been required to correctly measure the flow of crude oil and various petroleum products such as gasoline and kerosene in view of recent striking price rises, for instance, in oil storing tanks, oil refining plants, fuel filling stations and the like.

The specific gravity and consequently the volume of liquid inclusive of such fuels vary depending on the temperature thereof. For instance, some kerosene has a specific gravity of 0.810 at a temperature of 15° C., 0.820 at 0° C. and 0.803 at 25° C. Supposing that a diesel engine automobile is supplied with such kerosene. Measured by volume, the same amount of fuel costing $50 at 0° C. would cost $51.06 at 25° C., if no compensation is made in the metering device in reference to the supplied fuel temperature at the moment.

Like many countries, the Japanese Industrial Standard prescribes coefficients for compensating for the volume of crude oil and petroleum products having specific gravities ranging from 0.5 to 1.1 at a standard temperature of 15° C., in reference to various temperatures. For instance, in JIS K2250, the specific gravities of crude oil and petroleum products whose flow is to be measured are given in increments of 0.005 and the temperatures to be taken into consideration for determining the coefficient for the compensation are given in increments of 0.5° C.

The compensation is to be made in reference to considerably bulky tables such as JIS K2250. For instance, for kerosene having a specific gravity of 0.810, the coefficient is given as 1.0132 at 0° C. and 0.9912 at 25° C. on the corresponding table. Thus, the nominal volume measured by a meter must be compensatingly multiplied by 1.0132 when the liquid temperature is 0° C. and by 0.9912 when it is 25° C. to make it coincident with the standard volume at 15° C.

Such compensation may be made according to various methods. It is of course possible to calculate using such coefficients in reference to ambient temperature, but this is too annoying and incorrect since there is too much difference between liquid temperature and ambient.

Mechanical automatic compensation has been used fairly widely, in which temperature fluctuation is converted to the mechanical displacement of bellows which adjusts the flow meter. This is far from the recent severe requirement mainly because the volume change rate is not uniform depending on the specific gravity of the liquid.

U.S. Pat. No. 4,101,056 proposes to compensate the metered volume by means of an electronic computer. However, the compensation is made therein by every one program cycle so that it is necessary to calculate volume during this one cycle from the rotation angle of the meter. Furthermore, fairly important changes in characteristics of circuitry elements such as capacitors, resistances and semiconductors, which must be arranged in considerable numbers in amplifiers and analog-digital converters, which changes are caused by deterioration of the elements and ambient temperature fluctuation, are ignored therein. In addition, it is preferable to pay more attention to the compactness and cost of the device.

SUMMARY OF THE INVENTION

A fundamental object of the invention is to provide a device for measuring liquid flow volume while effectively making compensation of the metered volume in reference to detected temperature of liquid by means of an electronic computer with less stored imformation.

Another object is to provide such a metering device adapted to also compensate for errors caused by changes of the characteristics of various circuit elements.

Still a further object of the invention is to provide such a device so designed as to permit calibration without the necessity of actual liquid flow.

Still another object is to provide such a metering device with compact and reliable means for setting the specific gravity of a liquid whose flow is to be measured.

The other objects and various advantages of the invention will be appreciated by those skilled in the art by studying the more detailed explanation of the preferred embodiments to be made hereafter in reference to the accompanying drawings.

DETAILED DESCRIPTION OF THE PREFERRED EMBODIMENTS

Figure 1:
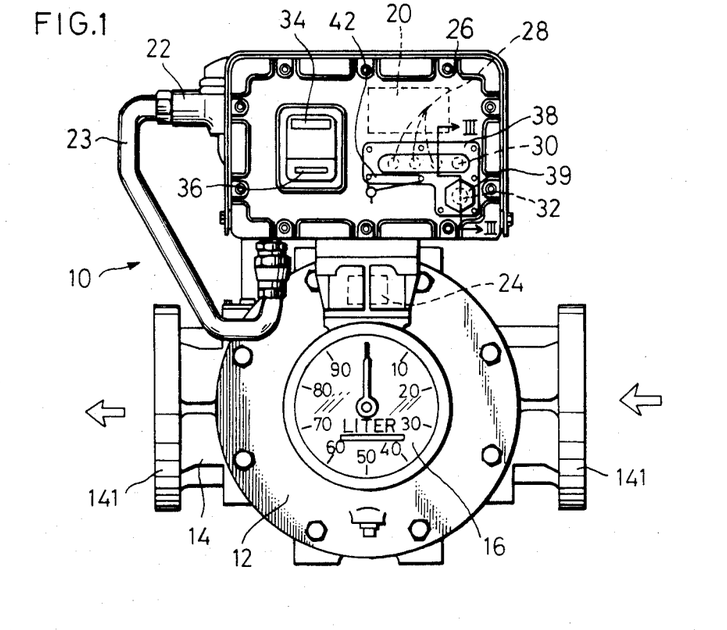
FIG. 1 is a front plan view of a temperature-compensating flow measurement device in accordance with the present invention.
Figure 2:
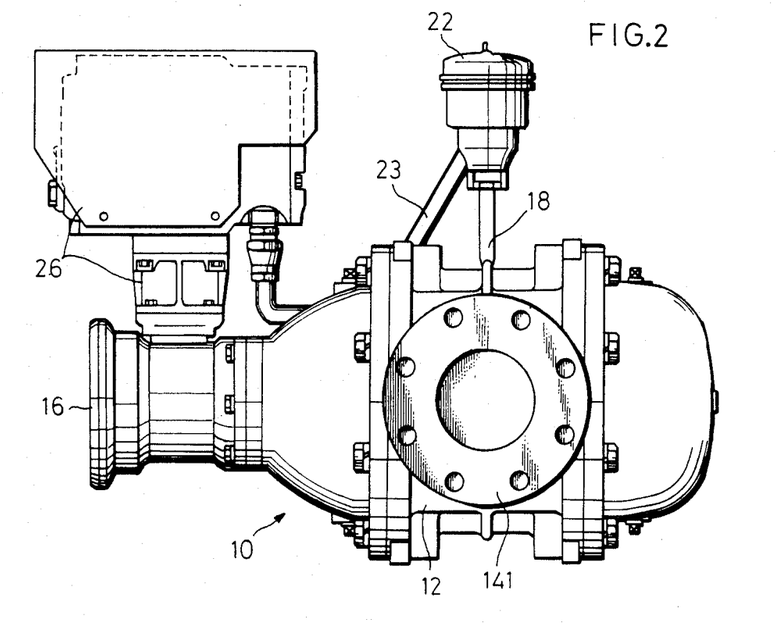
FIG. 2 is a side plan view of the device shown in FIG. 1.

FIGS. 1 and 2 show a temperature-compensating flow measurement device 10 for use in a gasoline or other petroleum products dispensing unit in accordance with the present invention. The device has a flow meter 12 of the conventional type mounted on a connection conduit 14 having connection flanges 141 at both ends. The flow meter 12 has an indicator 16 indicating volumetric flow which is not subjected to temperature-compensation, and a temperature detecting means or a temperature sensor 18 for measurement of the temperature of the fluid flowing through the conduit 14. The temperature sensor 18, such as a platinum resistance thermometer or a thermistor, is connected to a computer or control unit 20 by means of a connector 22 and a line 23. The temperature sensor 18 may be of a capacitor type. The out-put of the flow meter 12 is also introduced into the control unit 20 through a flow pulse generator or an encoder 24.

The control unit with computer 20 and the encoder 24 are accommodated in an explosion-proof box 26 mounted on the flow meter housing. On the front panel 261 of the explosion-proof box 26, specific gravity setting dials 28, an instrumental error regulating dial 30, a selector button 32, an integrating indicator 34, and a display 36 for selectively displaying set values as to specific gravity, instrumental error correction values, etc., stored in a microcomputer of the control unit 20 are suitably arranged. The dials 28, 30, button 32, indicator 34, display 36 are all connected to the control unit 20 so as to make it possible to conduct signals between the control unit 20 and each of the elements. The selector button 32 is connected to the display 36 through the computer 20 and so designed that every pushing operation of the button changes in turn the indication on the display 36 in such a way, for instance, that one pushing operation provides the set specific gravity, another pushing operation provides the set instrumental error correction value, a further pushing operation provides any other set value, and after a number of pushing operations, the indication on the display 36 returns to the first one.

Figure 3A:
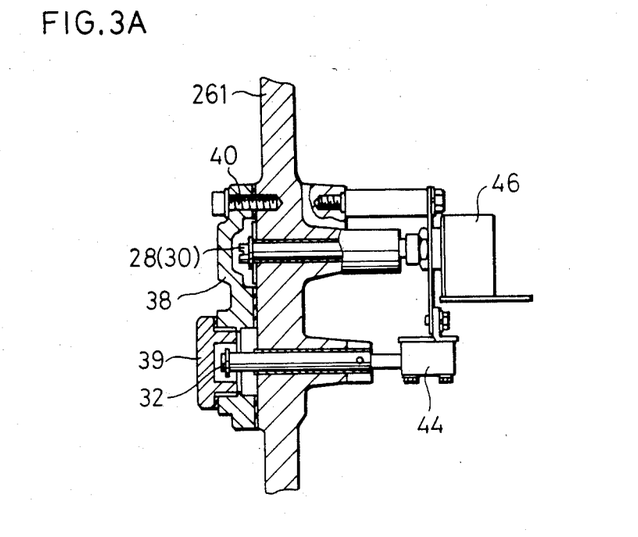
FIG. 3A is an enlarged section taken along a line III—III in FIG. 1 showing one of the specific gravity setting dials and a button for selectively displaying set values stored in the computer for observation.

FIG. 3A shows a form of sealed covering for the specific gravity setting dial 28, instrumental error regulating dial 30 and selector button 32 by means of a lid 38 secured to the front panel 261 by bolts 40. The bolts 40 are sealed with a wire 42 as shown in FIG. 1 so as to prevent the dials 28 and 30 from being wrongfully operated. The lid 38 has an opening at a portion opposed to the selector button 32 and a subsidiary lid 39 is arranged to close the opening by the engagement of threads formed thereon. The threaded subsidiary lid 39 is not sealed so that the operation of the selector button 32 can be made without dismantling the lid 38 by merely dismantling the subsidiary lid 39. In FIG. 3A, 44 is a switch operated by the selector button 32, and 46 are rotary switches each having ten contacts representing ten digits operated respectively by the specific gravity setting dial 28 and the instrumental error regulating dial 30. The switches 44 and 46 are suitably connected to the control unit 20.

Figure 3B:
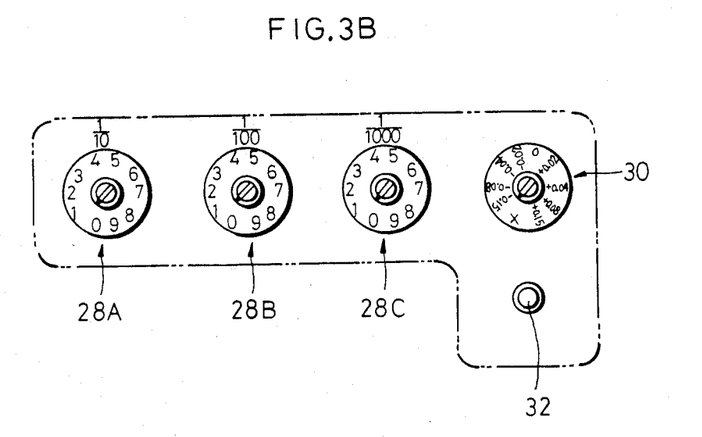
FIG. 3B is a view showing an arrangement of the specific gravity setting dials, an instrumental error regulating dial, and the selector button for the display unit.

FIG. 3B shows that the specific gravity setting dial 28 includes three dials 28A, 28B, 28C by which the specific gravity of a number up to four figures can be set. The dial 28A is for a figure of 1/10, 28B is for 1/100 and 28C is for 1/1000. The dial 28A, is however, adapted to indicate "1.0" by the graduation "0", and "1.1" by the graduation "1". The graduation "5", "6", "7", "8" and "9" represent "0.5", "0.6", "0.7", "0.8" and "0.9", respectively. The graduations "2", "3" and "4" are not used, because the oil (such as crude oil, refined oil, LPG or the like) intended to be measured by the device has a specific gravity (g) included within the range of 0.5 to 1.1 according to the standard table. When, for instance, a fuel oil of a specific gravity of 1.057 is to be set, the dial 28A is set to the graduation "0", the dial 28B is set at "5" and the dial 28C is set at "7". For an oil having a specific gravity of 0.728, the dial 28A is set at "7", the dial 28B at "2", and the dial 28C at "8". Such an arrangement and construction of the dials as well as the common use of the display contribute to make the device compact.

Figure 4:
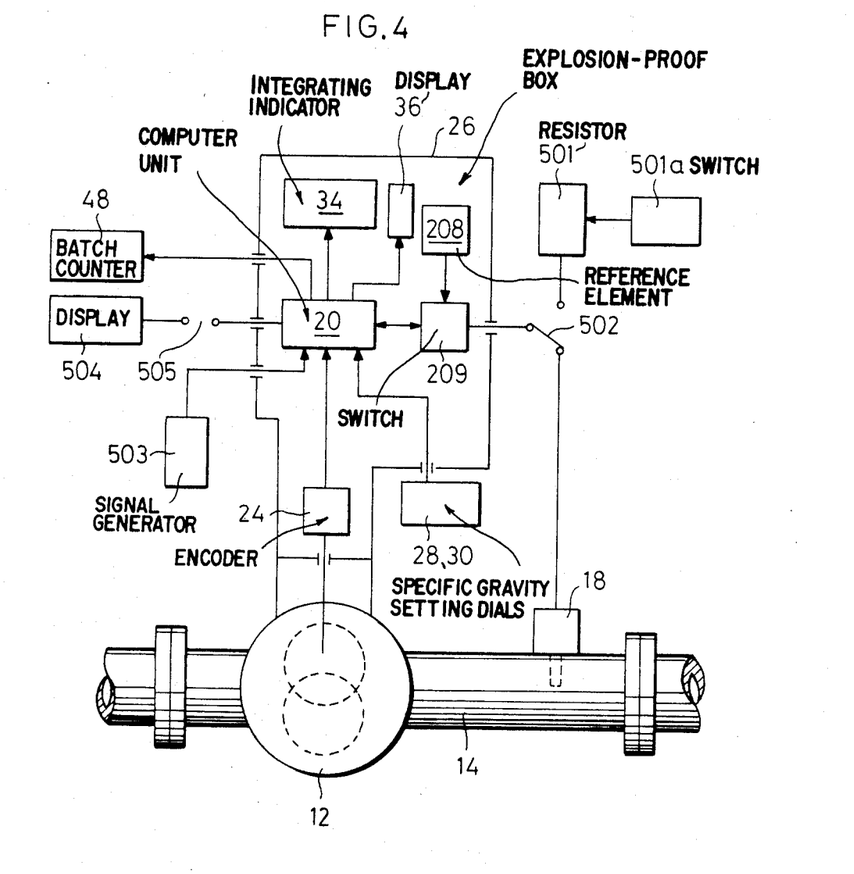
FIG. 4 is a block diagram of the device.
Figure 5:
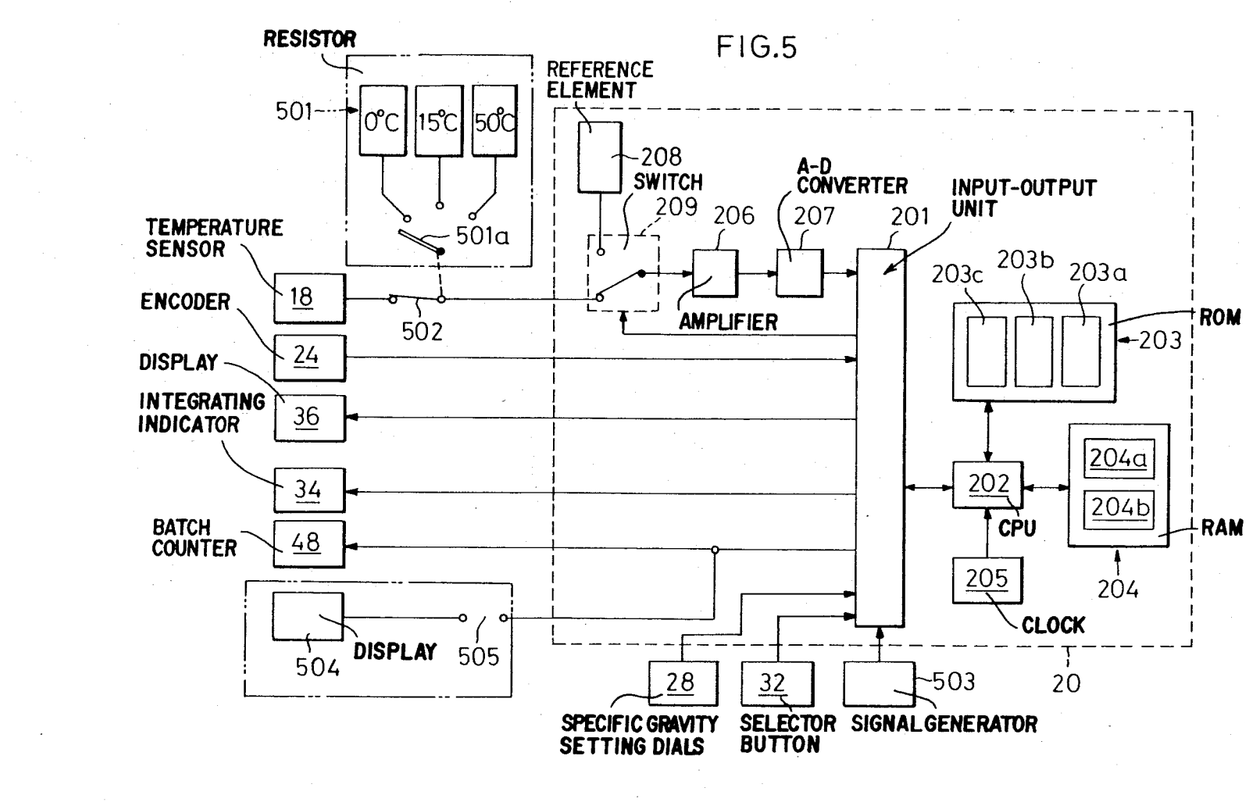
FIG. 5 is a block diagram showing details of a control unit having a microcomputer installed in the device.

Referring to FIGS. 4 and 5, the temperature-compensating flow measurement device 10 in accordance with the present invention will be further described hereinafter in detail.

As apparent from FIG. 4, the flow meter 12 is connected with the control unit with computer 20 through the encoder 24 so that the measured volumetric value is fed to the computer after conversion to a pulse signal. The pulse signal generator or encoder 24 has a disc (not shown) connected with an output shaft of the flow meter 12 so that the disc is rotated in conjunction with the revolution of the output shaft. The disc has a number of radially extending slits (for instance 360 slits) arranged in a row with the same interval between every adjacent two slits. The encoder 24 also has a light source and a photoelectric detector cell arranged opposite one another for putting the slit formed portion of the disc therebetween, so that a pulse signal is generated each time the light ray from the light source is interrupted by a portion between two adjacent slits of the rotating disc. The computer unit 20 is also supplied with a signal from the temperature sensor 18 in connection with the temperature of the oil flowing through the conduit 14, after conversion into a digital signal. In the computer 20, the volume coefficients for oils or petroleum products each having a different specific gravity are memorized over the predetermined range of temperatures. In other words, for instance, the data in the volume coefficient table in connection with crude oil and petroleum products, prescribed by JIS (Japanese Industrial Standard) under the number of K-2250, are memorized or stored in the computer.

Upon receiving the signal of the temperature of the fluid flowing through the conduit 14, the computer 20 picks up a corresponding volume coefficient and prepares to conduct a calculation every arrival of a signal from the encoder 24. Each time the computer 20 receives a signal from the encoder 24, the computer makes a calculation to provide a corrected volume which is transmitted to the integrating indicator 34 and, as the case may be, to a batch counter 48 which observes, for instance, the oil supply to a tank lorry.

FIG. 5 shows details of the control unit 20 having the computer including an input-output unit 201 to which the above mentioned temperature sensor 18, encoder 24, display 36, integrating indicator 34, batch counter 48, specific gravity setting dial 28 and selector button 32 are connected as shown in FIG. 5. The computer also has a CPU 202, a read-only memory (ROM) 203, a random access memory (RAM) 204, and a clock 205. The memory 203 has a first area 203a in which the data of the volume coefficients are memorized, a second area 203b in which equations or calculation algorithms for the purpose to be explained hereinafter are memorized, and a third area in which predetermined programs are memorized. The temporary storage 204 has a first area 204a for temporarily memorizing volume coefficients for a set specific gravity by taking them out from the volume coefficient data in first area 203a, and a second area 204b in which fractions or residual volume calculated by subtraction of a unitary volume from the sum of the corrected volume per a signal and the preceding residual volume are temporarily memorized. A signal for the unitary volume is transmitted one by one to the integrating indicator 34. The clock 205 serves to give the necessary instructive pulse to the computer so that, for instance, the CPU 202 measures an occasional temperature of the oil or fluid and provides a corresponding volume coefficient. The generation of subsequent instructive pulses every few seconds is sufficient in view of the time constant of the temperature sensor 18 and also because the temperature change of the fluid generally occurs gently.

The control unit 20 also has an amplifier 206 and an analog-digital (A-D) converter 207 so that the signal from the temperature sensor 18 is fed to the computer through both elements.

As known in the art, the A-D converter and the amplifier are composed of capacitors or condensers, resistors and semi-conductors whose characteristics vary over the years and in accordance with the ambient temperature. Such changes of characteristics result in bringing incorrect digital signals to the computer even if the temperature sensor generates a signal of a correctly measured value. This disadvantage may be avoided if high quality expensive condensers, resistors and semi-conductors are used. However, a few or several decades of such elements are necessary for each instrument, which results in considerable rise of the cost. Even if such expensive instruments are acceptable, the circuit error caused by other members such as leads cannot be compensated.

In accordance with the invention, the temperature-compensating flow measurement device is provided with a means for completely compensating the circuit error, which cannot be ignored relative to the error caused by the temperature fluctuation, in spite of the relatively inexpensive A-D converter and amplifier. In FIG. 5, the compensating means is illustrated, which includes a reference means 208 preferably composed of a reference resistance of high quality which hardly changes its characteristic with time and in accordance with ambient temperature change, and a switch means 209 arranged so as to selectively connect either the reference member 208 or the temperature sensor 18 to the input-output unit 201 for the computer. The switch means 209 may be composed of a known relay switch or an analog switch using a transistor and is adapted to be operated by a signal from the CPU 202.

The operation of the compensating means shall be described hereinafter in conjunction with the subsequent operation for obtaining a corresponding volume coefficient at the measured temperature, referring to the program flow chart set forth in FIG. 7.

First, with the program memorized in the memory 203c, the CPU 202 delivers a signal for the switchover of the switch means 209 so as to make a circuit of reference resistance 208, amplifier 206, A-D converter 207 and input-output unit 201 of the computer (step S10). The resistance value of the reference resistance 208 is then sent through amplifier 206, A-D converter 207 and input-output unit 201 to the CPU 202 to be read thereby (step S11). A resistance value [A] obtained under the condition that the amplifier 206 and the A-D converter 207 are of characteristics hardly adversely affected by the secular change and temperature change has been memorized in the RAM 204. Assuming that the CPU 202 reads the resistance value of the reference resistance 208 as [Ax], it is sure that the value [A] is changed to [Ax] on the way to the CPU 202 due to the error of the amplifier 206, the A-D converter 207 and the leads. The CPU 202 calculates a circuit correction coefficient [A/Ax] (step S12). The correction coefficient [A/Ax] is memorized in the first area 204a of the RAM 204 (step S13).

The CPU 202 then delivers a signal for the changeover of the switch means 209 so as to close a circuit of temperature sensor 18, switch means 209, amplifier 206, A-D converter 207 and input-output unit 201 of the computer (step S14). Thus, a resistance value corresponding to the temperature measured by the temperature sensor 18 is read by the CPU 202 (step S15). Assuming that the CPU 202 reads the resistance value from the sensor 18 as [B], the CPU 202 calculates a correct temperature $[(B \times A)/Ax]$ using the memorized circuit correction coefficient [A/Ax] and the resistance value [B] (step S16). As described above, the table of the volume coefficients in connection with the temperatures as regulated by, for instance, the JIS are memorized, so that a volume coefficient corresponding to the measured temperature can be obtained therefrom (step S17) and memorized in the area 204a of the RAM 204 (step S18).

As mentioned above, the first area 203a of the memory (ROM) 203 stores the data of the volume coefficients for oils or petroleum products. In general, the volume coefficients are determined corresponding to the finely graduated specific gravities and temperatures. For instance, in accordance with the table of volume coefficients regulated by the JIS, the specific gravities are graduated every 0.005 and the temperatures are graduated every 0.5° C., so that a large number of volume coefficients for specific gravities and temperatures must be memorized in the first area 203a for the purpose of rendering the device applicable to a large number of oils or petroleum products and a correspondingly wide area must be prepared in the memory (ROM) 203.

In order to save the area of memory but assure necessary compensation on any set specific gravity, in accordance with the invention, the following is preferably taken. For instance, in the ROM in particular, in the first area 203a, the memory of the volume coefficients is made every 0.03 for the specific gravities and every 5° C. for the temperatures. Furthermore, regarding only a reference temperature (−25° C. in the following table), complete data of the volume coefficients for the selected specific gravities are memorized. Regarding the other selected temperatures, the volume factors are memorized as a difference between the volume factors of the adjacent two temperatures. Furthermore, the numerical value of each difference is memorized with a 10000 times value.

The following table shows a part of actual data memorized in the first area 203a of the ROM 203 in accordance with the preferable manner as explained above.

TABLE 1

| temperatures °C. | Volume coefficients specific gravities | | | |
|---|---|---|---|---|
| | ... | 0.78 | 0.81 | 0.84 | ... |
| −25 | | 1.0387 | 1.0353 | 1.0329 |
| −20 | | 48 | 44 | 41 |
| . | | . | . | . |
| . | | . | . | . |
| . | | . | . | . |
| 5 | | 48 | 44 | 41 |
| 10 | | 49 | 44 | 41 |
| 15 | | 48 | 44 | 41 |
| 20 | | 49 | 44 | 41 |
| 25 | | 48 | 44 | 41 |
| . | | . | . | . |
| . | | . | . | . |
| 75 | | | | |

The memorized data are arranged on the basis that the volume coefficient values of the specific gravity or the temperature between the adjacent two memorized specific gravities or the adjacent two memorized temperatures can be calculated by interpolation considering that the volume coefficients for the intermediate values change substantially linearly.

When the data of the volume coefficients are coarsely memorized with abbreviations in the above manner, each volume coefficient is obtained by calculations using equations or calculation algorithms memorized in the computer.

When an intermediate specific gravity lying between the adjacent two memorized specific gravities is set, the numerical value of the volume coefficient is calculated as follows:

Assuming, for instance, that the specific gravity of 0.825 is set, the volume coefficient at the basic temperature of −25° C. can be calculated according to the proportional allocation as follows:

$$1.0353 + \frac{1.0329 - 1.0353}{0.84 - 0.81} (0.825 - 0.81) = 1.0341$$

The numerical value of the difference between the temperature −20° C. and the temperature −25° C. can be calculated according to the proportional allocation as follows:

$$44 + \frac{41 - 44}{0.84 - 0.81} (0.825 - 0.81) = 42.5 \approx 43$$

Likewise, the numerical value of the difference at the subsequent temperatures can be calculated. Consequently, the following data can be obtained in accordance with the calculation:

TABLE 2

| temperature | volume coefficient |
|---|---|
| −25° C. | 1.0341 |
| −20° C. | 43 |
| . | . |
| . | . |
| 5° C. | 43 |
| 10° C. | 43 |
| 15° C. | 43 |

TABLE 2-continued

| temperature | volume coefficient |
|---|---|
| 20° C. | 43 |
| 25° C. | 43 |
| . | . |
| . | . |
| 75° C. | |

Figures 6, 7:
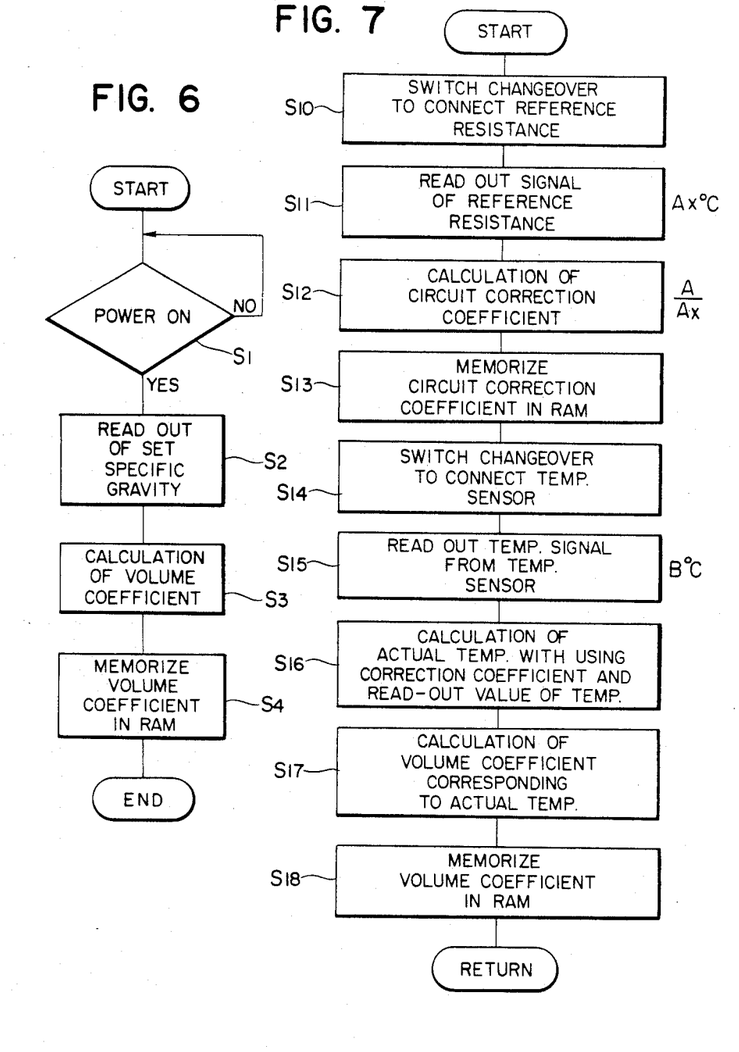
FIG. 6 is a flow chart of a control program calculating volume coefficients from temperatures for a fluid to be measured, and memorizing in the computer.
FIG. 7 is a flow chart of a control program providing a correct temperature signal in the computer, calculating a volume coefficient corresponding to the temperature and memorizing the coefficient in the computer.

This calculation can be made at the start of business of the day by merely turning a main switch on (step S1 in FIG. 6) when the device is adapted to measure the gasoline in a filling station, according to the control program shown in FIG. 6.

Referring to FIGS. 5 and 6, an operation for memorizing the data of volume coefficients for a set specific gravity shall be described.

First, a power switch of the flow measurement device is turned to the "on" position in advance of the start of measurement (step S1) so that the set specific gravity is read in the computer (step S2). Then, the CPU 202 computes the above mentioned calculation and provides the data of volume coefficients on the temperatures every, for instance, 5° C. for the set specific gravity (step S3) (when the data of the set specific gravity are those memorized in the RAM, such calculation as mentioned above is not necessary). The data obtained by the above calculation or memorized in advance in the ROM 203 in the form as described in Table 2 are memorized in the RAM 204 (step 4) in preparation for the calculation of a volume coefficient whenever an actual temperature is calculated at the step S16 in FIG. 7.

When an intermediate temperature lying between the adjacent two memorized temperature has appeared after the calculation at the step S16 in the flow shown in FIG. 7, the numerical value of the volume coefficient is calculated as follows:

Assuming, for instance, that the temperature obtained at step S16 is 22° C. when the specific gravity is set to 0.825, first the volume coefficient at 20° C. is calculated as follows using the data of Table 2:

$$1.0341 - \frac{\Sigma 20}{10000} = 0.9954$$

(Wherein, $\Sigma 20$ represents the total value of the differences from the temperature of −20° C. to the temperature of 20° C.) The volume coefficient at 25° C. is the calculated likewise as follows:

$$1.0341 - \frac{\Sigma 25}{10000} = 0.9911$$

Lastly, the volume coefficient at 22° C. is calculated as follows according to the proportional allocation using the obtained volume coefficients at the temperatures 20° C. and 25° C.:

$$0.9954 - \frac{0.9954 - 0.9911}{25 - 20} (22 - 20) = 0.9937$$

The calculations just mentioned are conducted at step S17 in the flow shown in FIG. 7. The obtained volume coefficient 0.9937 is memorized in the RAM as the volume coefficient at the temperature of 22° C. for oil of the specific gravity 0.825 so that the volume of oil measured by the flow meter 12 can be converted into the volume at the standard temperature of 15° C.

Under the condition that a volume coefficient at a present temperature is memorized in the RAM 204a, the pulse signals from the encoder 24 (FIGS. 4 and 5) are transmitted to the CPU 202 so that the necessary calculation is conducted there using the memorized volume coefficient to obtain the corrected volume, which is indicated in the integrating indicator 34.

In this case, the obtained fine numerical value of the corrected volume, composed, for instance, of five figures, is difficult for providing a pulse signal to the integrating indicator 34. To eliminate such difficulty, the following effective treatment is taken in accordance with a suitable embodiment of the present invention. This treatment shall be described hereinafter referring to the program flow chart set forth in FIG. 8.

Figures 8, 9:
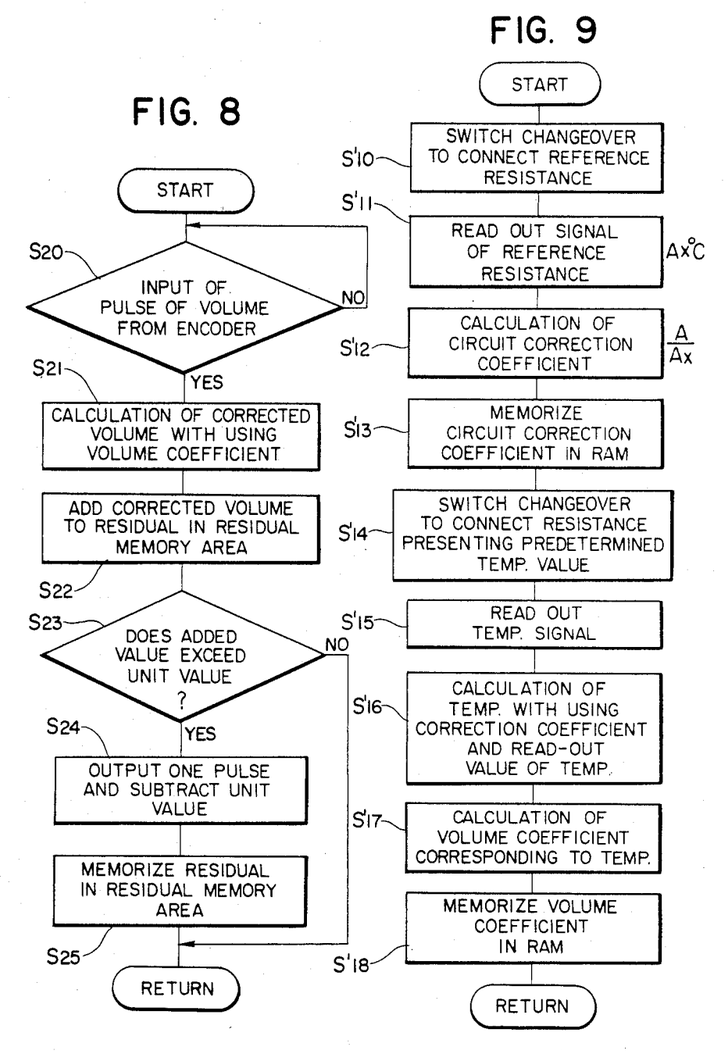
FIG. 8 is a flow chart of a control program calculating the corrected volume of the fluid and giving signals to a display.
FIG. 9 is a flow chart of a control program similar to FIG. 7 but for a calibration of the device without actually flowing fluid through the flow meter.

When a unit pulse [D] generated by the encoder 24 (FIG. 5) is fed to the CPU 202 (step S20), the CPU 202 treats the input signal as an interruption signal and makes the predetermined calculation using the volume coefficient [C] memorized in the RAM 204a and the supplied unit pulse [D] to provide a temperature-compensated volume value [CD] (step S21). The CPU 202 the makes an operation to add the temperature-compensated volume value to the fractions residual values calculated in the preceding operation and memorized in the ROM 204b (step S22). The CPU 202 then judges whether or not the added value exceeds the predetermined unit volume value (for instance, 0.1 l) (step S23), feeds one pulse (corresponding, for instance, to 0.1 l) to the integrating indicator 34 and the batch counter 48, and subtracts the unit volume value corresponding to one pulse from the added value (step S24). The CPU 202 then memorizes the residual value resulting from the subtraction in the RAM 204b (step S25) and waits for an incoming next pulse signal from the encoder 24. In step S23, when the added value has not reached the unit value, the CPU 202 waits for an incoming next pulse without delivering a pulse to the integrating indicator 34. Through this procedure, the indicator 34 is supplied only with a pulse signal corresponding to the unit volume value (0.1 l) and it enables the indicator 34 to be of simple construction which is merely adapted to indicate the integrate every unit volume value.

Referring now to FIGS. 4, 5, 9 and 10, means for calibrating the temperature-compensating flow measurement device without requiring actual liquid flow will now be described. As can be seen from FIGS. 4 and 5, the calibration means include a resistor 501 adapted to represent a predetermined temperature, a dummy volume signal generator, a calibration signal generator 503, and a compensated volume displaying means 504. In FIG. 5, three resistors representing respectively 0° C., 15° C. and 50° C. are shown so that either one of the resistors can selectively be connected by switches 501a, 502 and 209 to the input-output unit 201 of the computer. The dummy volume signal generator may be an independent pulse generator, or otherwise the dummy volume signal may be generated by the clock 205 in the computer or generated by a program memorized in the computer.

Figure 10:
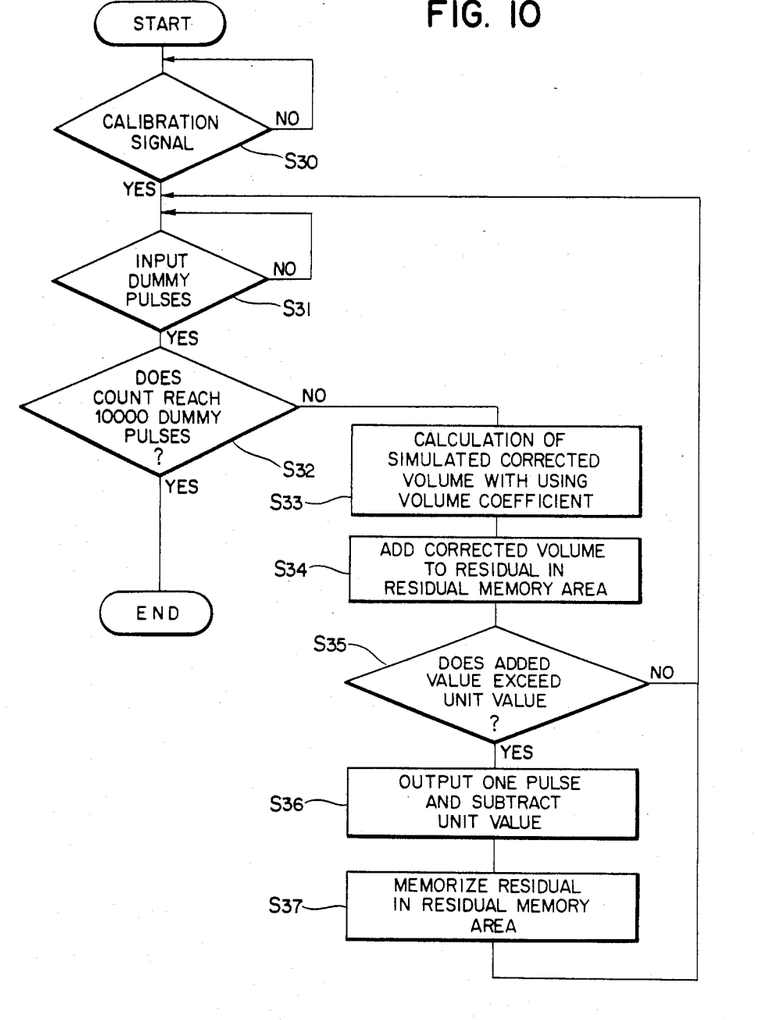
FIG. 10 is a flow chart of a control program similar to FIG. 8 but for a calibration of the device without actually flowing fluid through the flow meter.

The operation of the calibration means shall be described hereinafter, referring to the program flow charts set forth in FIGS. 9 and 10.

First, contacts 505 of the display 504 are connected to one another, the switch 502 is changed to contact with the selector switch 501a which is contacted with one of the three resistors, and the calibration signal generator 503 is manually operated so as to generate a calibration signal. Then, the operation is conducted through steps S'10 to S'18 shown in FIG. 9. Such steps are substantially the same as those shown in FIG. 7, except for step S'14 in which the computer is supplied with a signal not from the temperature sensor 18 but from the resistor 501. Therefore, no further explanation with respect to FIG. 9 is necessary.

After the operation shown in FIG. 9 is terminated, the calibration signal is fed from the generator 503 to the CPU 202 (step S30 in FIG. 10) so that the CPU 202 judges whether or not it is supplied with the dummy pulses (step S31) and whether or not the set pulses, for instance, 10000 pulses have been counted (step S32). Meanwhile, assuming that one pulse corresponds to 0.1 l, 10000 pulses correspond to 1 kl. As long as the counted pulses do not reach 10000 pulses, steps S33 to S37, which are identical to steps S21 to S25 shown in FIG. 8, are repeated. During the application of the calibration signal, the CPU 202 operates to send respective unit volume signals not to the integrating indicator but to the display for the calibration and the batch counter 48. When the 10000 dummy pulses have counted, a cycle of the operation for calibration terminates. The same operation is conducted by changing the resistor 501 to another one representing another temperature. The total amount of volume indicated in the display 504 is compared with a desired or theoretical volume value which is intended to be obtained at the temperature represented by the resistor 501, so that it is able to be detected whether or not the temperature compensation is correctly conducted and whether or not there is any trouble in the device, without the necessity of actual liquid flow.

What is claimed is:

1. An apparatus for measuring the volume of a flowing liquid while compensating for temperature variations in the liquid comprising:

a flow meter having a flow pulse generator for generating a flow pulse signal;

a resistance-type temperature sensing means for continuously detecting the temperature of said liquid and generating an analog temperature signal thereof;

a resistance-type reference means for generating an analog reference signal;

an A/D converter for converting said analog signal from said temperature sensing means or said reference means to a digital output signal;

a switch means for selectively connecting either said temperature sensing means or said reference means to said A/D converter;

an input-output unit connected to said A/D converter, said input-output unit also being connected to said flow pulse generator for receiving said generator flow pulse signal;

means connected to said input-output unit for setting a specific gravity value of the liquid;

displaying means connected to said input-output unit for displaying a calculated volume of liquid; and computing means connected to said input-output unit comprising:

a read-only memory for storing a first series of volume coefficients for the liquid based on different specific gravities and temperatures, the interval between adjacent volume coefficients for the specific gravities and adjacent volume coefficients for the temperatures being larger than the interval between each two specific gravities to be set and between each two temperatures to be measured;

means for reading the specific gravity value set in by said specific gravity setting means upon receipt of a starting signal, means for calculating a second series of volume coefficients for the set specific gravity value using said first series of volume coefficients stored in the read-only memory, and random access memory means for memorizing said second series of calculated volume coefficients;

means for applying an operating signal to said switch means to connect said reference means with said A/D converter, means for calculating a correction factor for said A/D converter using said reference signal from said reference means, means for calculating a corrected temperature using said correction factor and said temperature signal from said temperature sensing means through said A/D converter, means for calculating a corrected volume coefficient at the corrected temperature using selected data from said second series of calculated volume coefficients memorized in said random access memory means, said random access memory means also memorizing said calculated corrected volume coefficient;

calculating means for correcting said flow pulse signal by adjusting the pulses representing the volume of liquid using said flow pulse signal from said flow pulse generator and the corresponding calculated corrected volume coefficient memorized in said random access memory means, said calculating means providing a unit-pulse calculated volume based on a unit pulse from said flow pulse generator, said calculating means being operable to determine if said unit-pulse calculated volume exceeds a preset unit volume so as to provide a residue fractional value representing the difference between said unit-pulse calculated volume and said preset unit volume; said residue fraction value being temporarily stored in the random access memory means so that said residue fraction value will be added to subsequent unit-pulse calculated volumes based on subsequent unit pulses from said flow pulse generator; and means for forwarding pulses representing said preset unit volume to said displaying means when the unit-pulse calculated volume and subsequent unit-pulse calculated volumes exceed said preset unit volume.

2. The apparatus according to claim 1, wherein said computing means further comprises a resistance means representing a predetermined temperature, a further switch means for selectively connecting said temperature sensing means or said resistance means to said A/D converter, means for generating a dummy volume signal, manually operated means connected to said input-output unit for generating a calibration signal, means receiving said dummy value signal and connected to said input-output unit for calculating a compensated volume in response to manual actuation of said manually operated means based on said dummy volume signal and said predetermined temperature, and means for displaying said compensated volume, whereby said displayed compensated volume can be compared with a theoretical volume value without requiring actual liquid flow.

* * * * *